United States Patent [19]
Bartz et al.

[11] Patent Number: 5,373,026
[45] Date of Patent: Dec. 13, 1994

US005373026A

[54] METHODS OF INSULATING WITH PLASTIC STRUCTURES CONTAINING THERMAL GRADE CARBON BLACK

[75] Inventors: Arnold M. Bartz, Granville; Martin K. Hitchcock, Newark, both of Ohio

[73] Assignee: The Dow Chemical Company, Midland, Mich.

[21] Appl. No.: 200,058

[22] Filed: Feb. 22, 1994

Related U.S. Application Data

[63] Continuation-in-part of Ser. No. 184,744, Jan. 21, 1994, abandoned, which is a continuation of Ser. No. 990,961, Dec. 15, 1992, abandoned.

[51] Int. Cl.$^5$ ............................................. C08G 18/14
[52] U.S. Cl. ..................................... 521/82; 521/99; 427/373; 428/159
[58] Field of Search ................... 521/82, 99; 427/373; 428/159, 160, 314.4, 315.5

[56] References Cited

U.S. PATENT DOCUMENTS

| | | | |
|---|---|---|---|
| 3,486,967 | 12/1969 | Fisher | 161/160 |
| 3,619,343 | 11/1971 | Freeman | 161/160 |
| 3,950,304 | 4/1976 | Inomata et al. | 260/42.37 |
| 4,398,527 | 8/1983 | Rynbrandt | 123/668 |
| 4,795,763 | 1/1989 | Gluck et al. | 521/99 |

FOREIGN PATENT DOCUMENTS

| | | | |
|---|---|---|---|
| 58-111839 | 7/1983 | Japan | C08J 9/18 |
| WO9006339 | 6/1990 | WIPO | C08J 9/00 |

OTHER PUBLICATIONS

McIntire and Kennedy, *Styrofoam for Low-Temperature Insulation*, Chemical Engineering Progress, vol. 44, No. 9, pp. 727–730.

John Wiley and Sons, *Encyclopedia of Chemical Technology*, vol. 4, Third Edition, pp. 631–666, 1978, Kirk-Othmer, New York.

Harry S. Katz and John V. Milewski, *Handbook of Fillers and Reinforcements for Plastics*, pp. 277–291, 1978, Van Nostrand Reinhold Company, New York.

*Primary Examiner*—Maurice J. Welsh
*Attorney, Agent, or Firm*—J. Robert Dean, Jr.

[57] ABSTRACT

Disclosed is a method of insulating a surface or enclosure by applying to the surface or enclosure a polymeric foam structure of a polymer material and carbon black. The carbon black is generally uniformly dispersed in the polymer matrix in the form of discrete particles substantially free of agglomeration. A preferred carbon black is thermal black. The carbon black provides a number of advantages over those previously employed commercially. Further disclosed is a process for making the foam structure. Further disclosed is an extruded, insulative foam structure of the type described above.

78 Claims, No Drawings

METHODS OF INSULATING WITH PLASTIC STRUCTURES CONTAINING THERMAL GRADE CARBON BLACK

Cross-Reference to a Related Application

This application is a continuation-in-part application of U.S. Ser. No. 08/184,744, filed Jan. 21, 1994, which is a continuation of U.S. Ser. No. 07/990,961, filed Dec. 15, 1992, which are incorporated herein by reference and both of which are now abandoned.

BACKGROUND OF THE INVENTION

This invention relates to methods of insulating surfaces and enclosures with plastic structures containing a carbon black of certain configuration and type in a quantity sufficient to reduce the thermal conductivity of the structure.

Carbon black is known as an infrared radiation absorber and reflector, and has been commercially employed in insulative foam structures to reduce thermal conductivity. Extensive teachings of that use are seen in U.S. Pat. No. 4,795,763 and WO 90/06339, both of which are incorporated by reference herein. They disclose several types of carbon black, and further disclose useful particle size ranges and loading (i.e. weight) levels.

Problems with employing carbon black in insulative foam structures include processing problems and product quality problems.

One processing problem is the considerable difficulty of homogeneous dispersing or mixing the carbon black in a polymer melt or polymer gel of the melt with a blowing agent. Carbon black previously employed in insulative structures, furnace black, is commercially supplied in clusters of 2-90 particles due to thermal fusion during its manufacture. These clusters are practically impossible to break up during dispersion in the polymer melt or gel. Further, the clusters themselves are difficult to disperse in a polymer melt or gel due to electrostatic attraction between the clusters themselves. The dispersion problems may require expensive pre-compounding of the carbon black in the base polymer prior to manufacturing the foam structure. Pre-compounding is very expensive, and the carbon black still may not disperse sufficiently to achieve maximum reduction in thermal conductivity in the insulating foam structure or avoid processing or product problems. Further, the high loading levels of carbon black required to attain substantial reduction in thermal conductivity, typically 4-10 percent by weight of the foam structure, may further exacerbate the processing problems described above.

Another processing problem is the relatively large surface area and porosity of the previously-employed carbon black may attract and thus inhibit the activity of other additives during manufacture of the foam structures. This inhibition may result in a reduced additive activity, higher additive loading requirements, or switching to less desirable additives.

Another processing problem of the previously-employed carbon black is its tendency to cling or adhere to surfaces, process and otherwise. This surface cling results in housekeeping, cleanliness, and personal hygiene problems.

Another processing problem is an increase in process pressure drop observed upon addition of the previously-employed carbon black to a gel of polymer melt and blowing agent. The increased pressure drop may result in poorer skin quality, increased power consumption, increased equipment pressure duty, and increased die pressure.

Another processing problem is that high loading levels of the previously-employed carbon black can also create skin quality problems in extruded foam structures.

Another problem with using the previously-employed carbon black in foam structures is printability. The dark, black color of such foam structures makes printing on the foam structure difficult.

Another problem with foam structures employing the previously-employed carbon black, or, for that matter, foam structures without carbon black, is that of flame retardancy. Fire retardant additives are typically employed to enhance flame retardancy to desirable levels.

It would be desirable to find a carbon black which more readily disperses in a polymer melt. It would be further desirable to find a carbon black which enhances the dispersion in the pre-compounding step or possibly eliminates the need for it. It would be further desirable to find a carbon black which does not induce substantial process pressure drop or poor skin quality. It would further be desirable to find a carbon black which might possibly enhance the insulating capability of the foam structure such that the loading of carbon black required to achieve a given level of insulation might be reduced. It would further be desirable to have a foam structure that could more easily be printed on. It would be further desirable to find a carbon black which provides a foam structure with a level of flame retardancy not observed in the prior art.

SUMMARY OF THE INVENTION

According to the present invention, there is a method of insulating a surface or enclosure comprising applying to the surface or enclosure a polymeric foam structure comprising a foamed polymer material and carbon black incorporated therein. The carbon black is present in a quantity sufficient to reduce the thermal conductivity of the structure below that of a corresponding foam structure without carbon black. The carbon black is dispersed within the matrix of the foam structure in the form of discrete particles substantially free of agglomeration or clumping. The discrete, substantially non-agglomerated form of the carbon black allows it to be more easily dispersed and processed during the manufacture of the foam structure than carbon black which does not disperse in that form. Preferably, the individual particles have a particle diameter of greater than 150 nanometers. The relatively large particle size may possibly allow the infrared radiation reflecting and scattering properties of carbon black to be more effectively utilized.

A preferred carbon black is referred to commercially as thermal grade carbon black (thermal black). Thermal black might provide greater reduction in thermal conductivity for a given loading in some loading or concentration ranges than other types of carbon black previously employed in insulative foam structures. Surprisingly, thermal black provides greater flame retardancy for a given loading than other types of carbon black, particularly furnace black, previously employed in insulative foam structures. Additionally, thermal black is much easier to process and incorporate into the foam structure, and induces a lower process pressure drop than the other types of carbon black previously employed. Thermal black can also be pre-compounded with polymer at higher loadings (50 percent versus 30 percent for furnace black based on polymer weight). Thermal black also impacts skin quality to a lesser degree, and presents less of a cleanliness problem.

Further according to the present invention, there is a method of insulating a surface or enclosure comprising applying to the surface or enclosure a foam structure comprising a foamed polymeric material and a quantity of carbon black sufficient to reduce the thermal conductivity of the foam structure below that of a corresponding foam structure without the carbon black. The carbon black has an average particle diameter of greater than 150 nanometers and may be of any type known in the art.

Further according to the present invention, there is a process for making the above-described foam structure. A polymer material is heated to form a melt polymer material. The process comprises: heating a polymer material to form a melt polymer material; incorporating the carbon black described above into the melt polymer material to form a melt material mixture; incorporating a blowing agent into the melt material mixture at an elevated pressure to form a foamable gel; and extruding the foamable gel through a die to a zone of reduced pressure to form the foam structure.

Further according to the present invention, there are extruded, insulative plastic foam structures of a foamed polymeric material and carbon black of the type and configuration described above.

DETAILED DESCRIPTION

Suitable plastic materials may be selected from any of those which can be blown into foam. The plastic material may be thermoplastic or thermoset. Suitable plastics include polyolefins, polyvinylchloride, alkenyl aromatic polymers, cellulosic polymers, polycarbonates, polyetherimides, polyamides, polyesters, polyvinylidene chloride, polymethylmethacrylate, polyurethanes, polyisocyanurates, phenolics, copolymers and terpolymers of the foregoing, polymer blends, rubber modified polymers, and the like. Suitable polyolefins include polyethylene and polypropylene. Suitable polyethylenes include those of high, medium, low, linear low, and ultra low density types.

The present foam structure preferably comprises an alkenyl aromatic polymer material. Suitable alkenyl aromatic polymer materials include alkenyl aromatic homopolymers and copolymers of alkenyl aromatic compounds and copolymerizable ethylenically unsaturated comonomers. The alkenyl aromatic polymer material may further include minor proportions of non-alkenyl aromatic polymers. The alkenyl aromatic polymer material may be comprised solely of one or more alkenyl aromatic homopolymers, one or more alkenyl aromatic copolymers, a blend of one or more of each of alkenyl aromatic homopolymers and copolymers, or blends of any of the foregoing with a non-alkenyl aromatic polymer. Regardless of composition, the alkenyl aromatic polymer material comprises greater than 50 and preferably greater than 70 weight percent alkenyl aromatic monomeric units. Most preferably, the alkenyl aromatic polymer material is comprised entirely of alkenyl aromatic monomeric units.

Suitable alkenyl aromatic polymers include those derived from alkenyl aromatic compounds such as styrenic, alphamethylstyrene, ethylstyrene, vinyl benzene, vinyl toluene, chlorostyrene, and bromostyrene. A preferred alkenyl aromatic polymer is polystyrene. Minor amounts of monoethylenically unsaturated compounds such as $C_{1-4}$ alkyl acids and esters, ionomeric derivatives, and $C_{2-6}$ dienes may be copolymerized with alkenyl aromatic compounds. Examples of copolymerizable compounds include acrylic acid, mathacrylic acid, ethacrylic said, maleic acid, itaconic acid, acrylonitrile, maleic anhydride, methyl acrylate, ethyl acrylate, methyl methacrylate, vinyl acetate and butadiene. Preferred structures comprise substantially (i.e. greater than 95 percent) and most preferably entirely of polystyrene because polystyrene is economical, and is commonly employed in insulating plastic foam.

The type of carbon black incorporated in the present foam structure differs in part from that currently commercially employed because it disperses in the foam structure in a more discrete particle form preferably substantially free of agglomeration. The carbon black currently employed in insulative foam structures, furnace black, primarily disperses in the foam structure in the form of clusters or agglomerations of individual carbon black particles. The type of carbon black useful in the present foam structure, thermal black, will disperse in the foam structure much more readily than furnace black.

A type of carbon black which will disperse in a substantially discrete particle form is known in the art as thermal grade carbon black or thermal black. Other types of carbon black, including furnace black, acetylene black, channel black, and lamp black, do not provide the desired degree of dispersion in the polymer matrix. Additional teachings distinguishing thermal black from other types of carbon black are seen in the following publications: John Wiley and Sons, *Encyclopedia of Chemical Technology*, Volume 4, Third Edition, Pages 631–666, 1978, Kirk-Othmer, New York; and Harry S. Katz and John V. Milewski, *Handbook of Fillers and Reinforcements for Plastics*, Pages 277–291, 1978, Van Nostrand Reinhold Company, New York. Both publications are incorporated herein by reference.

Thermal black affords advantages over other types of carbon black, particularly furnace black, in use in foam structures. Important advantages include enhanced processability, lower process pressure drop, enhanced foam flame retardancy, possibly enhanced insulating performance, and better foam skin quality.

Thermal black is much more easily processed in making foam structures than other types of carbon black because it is much more easily dispersed in the polymer melt or the polymer gel of the melt and the blowing agent prior to extrusion into the foam structure. The discrete particle form, generally spherical shape, and relatively low average surface area of thermal black render it more easy to disperse in the polymer melt compared to other types of carbon black. Other types of carbon black, particularly furnace black currently commercially employed in insulative foam structures, are manufactured in thermally fused clusters or agglomerations of 2 to 90 particles. The clusters are very difficult to break up during dispersion of carbon black in a polymer melt or gel in a foam-forming process. In contrast, thermal black is primarily agglomerated largely by electrostatic forces. These clusters of electrostatically-attracted particles are easier to break up and disperse than clusters of thermally-fused particles. Thermal black may, like furnace black, thermally fuse into clusters, but such clusters typically occur in groups of only two or three particles. Thus, a desirable dispersion of thermal black may be described as being substantially free of agglomeration.

Thermal black is typically made by high temperature decomposition of hydrocarbons in an oxygen-deprived environment and in the absence of flames. The decomposition is a strongly endothermic reaction requiring a relatively large heat energy input. Additional teachings concerning the making of thermal black are seen in the publications cited above.

Another distinguishing feature of the present invention is the particle size of the carbon black. Though carbon black of any particle size may be used in the present foam structure, desirable particle size is preferably greater than 150 nanometers and more preferably about 200 to about 500 nanometers. These preferred particle size ranges further distinguish the prior art for particle size ranges for carbon black in insulating foams because they are larger. The larger particle size relates to the various advantages of thermal black described herein. All the particles of a given loading of carbon black need not be greater than 150 nanometers. Carbon black is typically sold in samples with an average particle size. The distribution of particle sizes will vary considerably around the average. Preferred particles will be that fraction of particles in the particle sample having a particle size diameter greater than 150 nanometers. A most preferred sample or loading of carbon black will have an average particle diameter of greater than 150 nanometers.

Insulating foam structures having larger particles might possibly provide greater insulating capability or lower thermal conductivity for a given loading (weight) of carbon black in some loading or concentration ranges than do insulating foam structures having the same loading with smaller particles. It follows that an insulating foam structure might possibly utilize a smaller loading of larger particles to achieve a given thermal conductivity than with smaller particles. Thermal black has an advantage over other types of carbon blacks, including furnace black, in that it can be manufactured in relatively large particle sizes. Thermal black is commercially available in sizes greater than 150 nanometers. Larger particle sizes might possibly provide lower thermal conductivity to the foam structure than do small particles for any type of carbon black particle, including thermal black and furnace black. However, due to processing considerations it is preferred the carbon black be non-pelletized.

Though not bound by any particular theory, larger particles of carbon black might possibly lower the thermal conductivity of a foam structure more than smaller particles because of enhanced infrared radiation scattering. For common infrared radiation wavelengths, about 5–20 micrometers at ambient temperatures, and particle sizes of 100 to 500 nanometers, Rayleigh scattering dominates. The degree of scattering or scattering coefficient may be described by the following equation:

$$\sigma = 4\Pi^2 \frac{NV^2}{\lambda^4} \frac{\eta^2 - \eta_0^2}{\eta^2 + 2\eta_0^2}$$

$\Pi$ = pi (~3.14)
N = number of particles per unit volume
V = volume of a particle
$\lambda$ = wave length of radiation
$\eta$ = index of refraction of the particle
$\eta_0$ = index of refraction of the polymer matrix Thus, infrared radiation scattering is a function of the square of the volume of individual particles. It might possibly follow that the larger the particles, the greater the extent of radiation scattering, and, thus, the lower the thermal conductivity in the foam structure.

Larger carbon black particles might provide the additional advantage of lowering the conductive thermal conductivity of the foam structure. Carbon black, which has a higher thermal conductivity than most polymer materials, including polystyrene, acts as a bridge or domain for heat conduction through the solid polymer matrix of the foam structure. Larger particles, particularly those of a spherical shape, minimize geometric particle dimensions for heat conduction for a given loading of carbon black.

Thermal black has an additional advantage over carbon blacks previously used in insulating foam structures, including furnace black, in that a greater proportion of thermal black is deposited at the cell walls of foam cells upon foaming than with other carbon blacks. Though the mechanism of enhanced (greater) deposition at the cell wall is not well understood, such deposition results in lower solid conduction thermal conductivity and lower radiative thermal conductivity in the foam structure. The solid conduction thermal conductivity is believed to be lower because of lower thermal conductivity across the cell gas/carbon black interface than the carbon black/polymer interface. The radiative thermal conductivity is believed to be lower because of the higher index of refraction between the cell gas/carbon black interface than the carbon black/polymer interface.

A factor which may limit the particle size of carbon black in a closed-cell foam structure is the thickness of cell walls. The particle size is preferably less than the cell wall thickness. The average particle size of carbon black preferably comprises about one-half or less of the average cell wall thickness of the foam structure. Limiting the average particle size to about one-half or less of the average cell wall thickness allows for normal statistical variation around the averages of both the particle size and cell wall thickness to ensure the physical integrity of a closed-cell foam structure. Average cell wall thickness is measured by optical methods. Average particle size is preferably an arithmetic mean based upon weight. For an open-cell foam structure, the particle size is not a critical factor regarding the physical integrity of the structure.

The dispersal of carbon black particles within the polymer matrix of the foam structure in a discrete particle form preferably substantially free of agglomeration might possibly further lower the thermal conductivity of the foam structure. Since carbon black has a higher thermal conductivity than most polymers, including alkenyl aromatic polymers, it is desirable to minimize geometric dimensions of particles or clusters of particles to avoid formation of heat conduction bridges or domains. With a discrete particle form, heat conduction bridges or domains of clustered particles are avoided, and thermal conduction through the carbon black is minimized. Furnace black commercially employed in insulating foam structures is commonly present in a foam structure in the form of clusters of 2–90 particles. In contrast, thermal black is preferably present in the foam structure in a substantially discrete particle form. Thus, thermal black might possibly provide a lower thermal conductivity in an insulative foam structure for a given loading than furnace black.

The carbon black is present in a quantity sufficient to reduce the thermal conductivity of the foam structure below that of a corresponding foam structure without the carbon black. The carbon black is preferably present at from about 1.0 to about 25 weight percent and more preferably at from about 4 to about 10 weight percent based on the weight of the polymer material in the foam structure. About 4 to about 10 weight percent carbon black is typically sufficient to substantially retard the radiation component of heat transfer in ⅜ inch (0.95 cm) to 6 inch (15 cm) thick foam panel structures in conventional residential and building insulating applications (−30° C. to +50° C. temperature service range).

The foam structure has a low degree of flammability or a high degree of flame retardancy. A useful measure of flammability is the Limiting Oxygen Index (LOI), determined according to ASTM D2863-91. It is desirable to maximize LOI. The foam structure preferably has an LOI of about 24 percent or more. It was found surprising that a foam structure having thermal black has a greater LOI than a corresponding foam structure having furnace black for a given loading of carbon black.

In making the present foam structure, it is desirable to minimize pressure drop through the process to enhance the ease of manufacture and lower manufacturing costs. It was found surprising that a foam structure having thermal black could be made at a lower process pressure drop than a corresponding foam structure having furnace black for a given loading. Preferably, the foam structure having thermal black is made at substantially the same or only slightly greater pressure drop than a corresponding foam structure without thermal black.

An additional advantage of employing thermal black rather than furnace black is the color of the resulting foam structure. For a given loading of carbon black by weight, thermal black provides a foam structure with a lighter color than does furnace black. At the loading levels described above for insulating foam structures, thermal black provides a silver or gray color to the foam structure, while furnace black typically provides a much darker, typically dark black, foam structure. The lighter silver or gray is easier to print on, which makes manufacturing easier and less expensive.

Thermoplastic polymer foam structures of the present invention are generally prepared by heating a polymer material to form a plasticized or melt polymer material, incorporating therein a blowing agent to form a foamable gel, and extruding the gel through a die to form the foam product. Prior to mixing with the blowing agent, the polymer material is heated to a temperature at or above its glass transition temperature or melting point. The blowing agent may be incorporated or mixed into the melt polymer material by any means known in the art such as with an extruder, mixer, blender, or the like. The blowing agent is mixed with the melt polymer material at an elevated pressure sufficient to prevent substantial expansion of the melt polymer material and to generally disperse the blowing agent homogeneously therein. The carbon black may be dry blended with the polymer material or mixed with the polymer melt or the polymer gel by any of the means described above. The carbon black may also be pre-compounded with the polymer in the form of a carbon black/polymer concentrate, which may subsequently be let down by extrusion with additional amounts of polymer. Optionally, a nucleator may be blended in the polymer melt or dry blended with the polymer material prior to plasticizing or melting. The foamable gel is typically cooled to a lower temperature to optimize physical characteristics of the foam structure. The gel is then extruded through a die of desired shape to a zone of lower pressure to form the foam structure. The zone of lower pressure is at a pressure lower than that in which the foamable gel is maintained prior to extrusion through the die. The lower pressure may be superatmospheric or subatmospheric (vacuum or evacuated), but is typically at an atmospheric level.

The dispersion of carbon black may be enhanced by coating it with a compatibilizing agent such as dibutyl phthalate prior to incorporation into the foam structure. The use of such agents is taught in U.S. Ser. No. 08/137,248, filed Oct. 14, 1993, which is incorporated herein by reference.

Though the preferred process for making the present structure is an extrusion process, it is understood that the above structure may be formed by expansion of pre-expanded beads containing a blowing agent. The bead s may be molded at the time of expansion to form articles of various shapes. Processes for making pre-expanded beads and molded expanded bead foam articles are taught in *Plastic Foams, Part II*, Frisch and Saunders, pp. 544–585, Marcel Dekker, Inc. (1973) and *Plastic Materials*, Brydson, 5th ed., pp. 426–429, Butterworths (1989), which are incorporated herein by reference.

Carbon black may be incorporated into bead foam in several ways. The carbon black may be admixed with a polymer resin melt during preparation of pre-expended beads. Carbon black may also be incorporated into bead foam by coating pre-expended beads prior to expansion and molding to form an article.

Polyurethane and polyisocyanurate foam structures are usually made by reacting two preformulated components, commonly called the A-component and the B-component. The carbon black and the blowing agent may be dispersed in either the isocyanate(A) or the polyol(B) or both.

Suitable polyisocyanates include diisocyanates such as m-phenylene diisocyanate, toluene-2,4-diisocyanate, toluene-2,6-diisocyanate, mixtures of 2,4- and 2,6-toluene diisocyanate, hexamethylene-1,6-diisocyanate, tetramethylene-1,4-diisocyanate, cyclohexane-1,4-diisocyanate, hexahydrotoluene 2,4- and 2,6-diisocyanate, naphthalene-1,5-diisocyanate, diphenyl methane-4,4'-diisocyanate, 4,4'-diphenylenediisocyanate, 3,3'-dimethoxy-4,4'-biphenyldiisocyanate, 3,3'-dimethyl-4,4'-biphenyldiisocyanate, and 3,3'-dimethyldiphenylmethane-4,4'-diisocyanate; the triisocyanates such as 4,4',4''-triphenylmethane-triisocyanate, polymethylenepolyphenyl isocyanate, toluene-2,4,6-triisocyanate; and the tetraisocyanates such as 4,4'-dimethyldiphenylmethane-2,2',5,5'-tetraisocyanate.

Suitable polyols include: ethylene glycol; propylene glycol-(1,2) and -(1,3); butylene glycol-(1,4) and -(2,3); hexane diol-(1,6); octane diol-(1,8); neopentyl glycol; 1,4-bishydroxymethyl cyclohexane; 2-methyl-1,3-propane diol; glycerin; trimethylolpropane; trimethylolethane; hexane triol-(1,2,6); butane triol-(1,2,4); pentaerythritol; quinitol; mannitol; sorbitol; formitol; a-methylglucoside; diethylene glycol; triethylene glycol; tetraethylene glycol and higher polyethylene glycols; dipropylene glycol and higher polypropylene glycols as well as dibutylene glycol and higher polybutylene glycols. Suitable polyols further include oxyalkylene glycols, such as diethylene glycol, dipropylene glycol triethylene glycol, tripropylene glycol, tetraethylene glycol, tetrapropylene glycol, trimethylene glycol and tetramethylene glycol.

The polyurethane foams can be prepared by reacting the polyol and the isocyanate on a 0.7:1 to 1.1:1 equivalent basis. The polyisocyanurate foams of the invention are advantageously prepared by reacting the polyisocyanate with a minor amount of polyol to provide about 0.10 to 0.70 hydroxyl equivalents of polyol per equivalent of polyisocyanate. Useful polyurethanes and polyisocyanurates and processes for making them are seen in U.S. Pat. No. 4,795,763, which is incorporated herein by reference.

The selection of blowing agent is not critical to the present invention. Useful blowing agents include inorganic agents, organic blowing agents and chemical blowing agents. Suitable inorganic blowing agents include carbon dioxide, nitrogen, argon, water, air, nitrogen, and helium. Organic blowing agents include aliphatic hydrocarbons having 1-9 carbon atoms and fully and partially halogenated aliphatic hydrocarbons having 1-4 carbon atoms. Aliphatic hydrocarbons include methane, ethane, propane, n-butane, isobutane, n-pentane, isopentane, neopentane, ethanol, dimethyl ether, and the like. Fully and partially halogenated aliphatic hydrocarbons include fluorocarbons, chlorocarbons, and chlorofluorocarbons. Examples of fluorocarbons include methyl fluoride, perfluoromethane, ethyl fluoride, 1,1-difluoroethane, 1,1,1-trifluoroethane (HFC-143a), 1,1,1,2-tetrafluoro-ethane (HFC-134a), pentafluoroethane, difluoromethane, perfluoroethane, 2,2-difluoropropane, 1,1,1-trifluoropropane, perfluoropropane, dichloropropane, difluoropropane, perfluorobutane, perfluorocyclobutane. Partially halogenated chlorocarbons and chlorofluorocarbons for use in this invention include methyl chloride, methylene chloride, ethyl chloride, 1,1,1-trichloroethane, 1,1-dichloro-1-fluoroethane (HCFC-141b), 1-chloro-1,1-difluoroethane (HCFC-142b), 1,1-dichloro-2,2,2-trifluoroethane (HCFC-123) and 1-chloro-1,2,2,2-tetrafluoroethane (HCFC-124). Fully halogenated chlorofluorocarbons include trichloromonofluoromethane (CFC-11), dichlorodifluoromethane (CFC-12), trichlorotrifluoroethane (CFC-113), 1,1,1-trifluoroethane, pentafluoroethane, dichlorotetrafluoroethane (CFC-114), chloroheptafluoropropane, and dichlorohexafluoropropane. Chemical blowing agents include azodicarbonamide, azodiisobutyro-nitrile, benzenesulfonhydrazide, 4,4-oxybenzene sulfonyl-semicarbazide, p-toluene sulfonyl semi-carbazide, barium azodicarboxylate, N,N'-dimethyl-N,N'-dinitrosoterephthalamide, and trihydrazino triazine.

A useful extruded alkenyl aromatic polymer foam structure can be made with about 4.0 to about 5.5 and more preferably about 4.5 to about 5.0 parts per hundred (pph) carbon dioxide based upon the weight of the polymer material.

The amount of blowing agent incorporated into the polymer melt material to make a foam-forming polymer gel is from about 0.2 to about 5.0, preferably from about 0.5 to about 3.0, and most preferably from about 1.0 to 2.50 moles per kilogram of polymer.

The foam component of the present foam structure preferably has a density of from about 10 to about 150 and most preferably from about 10 to about 70 kilograms per cubic meter. The foam preferably has an average cell size of from about 0.05 to about 5.0 and preferably from about 0.1 to about 1.5 millimeters according to ASTM D3576.

The foam component of the present foam structure may be closed cell or open cell depending upon the application. For most insulating applications, the present foam is desirably greater than 90 percent closed-cell according to ASTM D2856-A. A closed-cell structure substantially reduces convection effects, diffusion of insulating gas, and permeation of water vapor.

Various additives may be incorporated in the present foam structure such as inorganic fillers, pigments, antioxidants, acid scavengers, ultraviolet absorbers, flame retardants, processing aids, extrusion aids, and the like.

In addition, a nucleating agent may be added in order to control the size of foam cells. Preferred nucleating agents include inorganic substances such as calcium carbonate, talc, clay, titanium oxide, silica, barium sulfate, diatomaceous earth, mixtures of citric acid and sodium bicarbonate, and the like. The amount of nucleating agent employed preferably ranges from about 0.01 to about 5 parts by weight per hundred parts by weight of a polymer resin. A more preferred range is from 0.1 to about 3 parts by weight.

According to the present invention, the present foam structure may be used to insulate a surface or an enclosure by applying to the surface or enclosure an insulating panel fashioned from the present structure. Such panels are useful in any insulating surfaces or enclosures such as houses, roofing, buildings, refrigerators, freezers, appliances, piping, vehicles, and the like.

The present foam structure may be formed into a plurality of discrete foamed particles for conventional loose-fill cushioning and packaging applications, or may be ground into scrap for use as blown insulation.

The following are examples of the present invention, and are not to be construed as limiting. Unless otherwise indicated, all percentages, parts, or proportions are by weight.

EXAMPLES

Closed-cell polystyrene foam structures of the present invention were made by an extrusion process of the present invention. The foam structures were formed with a generally uniform dispersion of thermal black to reduce the thermal conductivity of the structure.

The apparatus employed to make the foam structures comprised an extruder, a mixer, a cooler or coolers, and a slot die in series. The extruder was a 2-½ inch (6.3 cm) single-screw type. The die had a width of 3 inches (7.5 cm) and a die gap of 0.03–0.10 inch (0.76–2.5 mm).

The feedstock polymer employed was polystyrene of 195,000 weight average molecular weight according to by size exclusion chromatography. Additives dry blended with the polystyrene prior to feeding to the extruder were low density polyethylene (melt index 2.0–2.6, density 0.915–0.919 gram/cubic centimeter) at 0.3 pph (parts per hundred) talc at 0.25 pph, magnesium oxide at 0.04 pph, and hexabromocyolododecane at 2.67 pph based on the weight of polystyrene. The extruder operated at a rate of 200 pounds per hour (91 kilograms per hour).

The blowing agent was injected into the mixer downstream of the extruder. The blowing agent comprised 9.0 pph 1-chloro-1,1-difluoroethane (HCFC-142b), 2.5 pph ethyl chloride, and 1.4 pph carbon dioxide based on the weight of the polystyrene.

The thermal blacks employed were Arosperse 15-213 and 15-239 (J. M. Huber Corp.). Arosperse 15-213 and 15-239 had an average particle size (diameter) of 405 nm and 265 nm, respectively according to ASTM D3849-89.

K-factor was determined according to ASTM C518-85. R value equals L/k where L is the sample thickness and k is the thermal conductivity (k-factor). Open cell content is determined according to ASTM 2856-A. Average cell size is determined according to ASTM D3576.

As shown in Table 1, the present foam structures containing thermal black provided substantially higher thermal resistance and lower thermal conductivity than the control foam structure without thermal black.

nanometers and a surface area of 80 square meters per gram.

The measure of flammability employed was the Limiting Oxygen Index (LOI) according to ASTM D2863-91. It is desirable to maximize the LOI.

Pressure drop was calculated by subtracting the die inlet pressure from the pressure at the mixer inlet. It is desirable to minimize pressure drop to enhance the ease of manufacture.

The comparative results are seen below in Table 2:

TABLE 1

Closed Cell Foam Structures Containing Thermal Black

| Sample Number | Carbon Black (parts by weight) | Foaming Temperature (°C.) | Die pressure psi (Kilopascals) | Foam Density pcf (kg/m$^3$) | Cell Size (mm) | Particle Size (nm) | k-factor (BTU-in hr-ft$^2$ °F.) | R per inch | Percent Improvement over Control |
|---|---|---|---|---|---|---|---|---|---|
| 1 | control sample* (no carbon black) | 125 | 875 (6029) | 2.17 (34.72) | 0.47 | — | .224 | 4.46 | Control Standard |
| 2 | 7 pph, Arosperse 15-213 (Thermal) | 125 | 725 (4995) | 2.09 (33.44) | 0.29 | 265 | .193 | 5.19 | 16.5 |
| 3 | 10 pph, Arosperse 15-213 (Thermal) | 125 | 710 (4892) | 2.11 (33.76) | 0.26 | 265 | .190 | 5.27 | 18.3 |
| 4 | 7 pph, Arosperse 15-239 (Thermal) | 122 | 875 (6029) | 2.20 (35.20) | 0.40 | 405 | .191 | 5.23 | 17.3 |
| 5 | 10 pph, Arosperse 15-239 (Thermal) | 122 | 813 (5602) | 2.13 (34.08) | 0.46 | 405 | .196 | 5.11 | 14.7 |

*Not an example of the present invention
pcf — pounds per cubic foot

Closed-cell polystyrene foam structures of the present invention were made, and were tested for flammability and process pressure drop was measured. The foam structures were compared to corresponding foam structures made with furnace black. The present foams made with thermal black showed greater flame retardancy and lower pressure drop than those made with furnace black. Both carbon blacks were compounded in the form of a concentrate with polystyrene and then further blended with additional polystyrene at the time of extrusion to achieve the desired carbon black loadings.

The apparatus employed to make the foam structures comprised an extruder, a mixer, a cooler or coolers, and a slot die in series. The extruder was a 2 ½ inch (6.3 cm) single-screw type.

The feedstock polymer employed was polystyrene of 135,000 weight average molecular weight according to size exclusion chromotography. Additives dry blended with the polystyrene prior to feeding to the extruder were hexabromocyolododecane at 2.0 pph, linear low density polyethylene at 1.0 pph, polypropylene glycol of 1200 weight average molecular weight at 1.0 pph, calcium stearate at 0.05 pph, and magnesium oxide at 0.05 pph based on the weight of the polystyrene.

The blowing agent was injected into the mixer downstream of the extruder. The blowing agent comprised 4.5 pph carbon dioxide based on the weight of the polystyrene.

The thermal black employed was Arosperse 15 (J. M. Huber Corp.) having an average particle size of 320 nanometers and a surface area of 8 square meters per gram. The furnace black employed was Black Pearls 450 (Cabot Corp.) having an average particle size of 27

TABLE 2

Flammability and Pressure Drop

| Carbon Black Type | Loading (pph)[1] | LOI (percent) | Pressure Drop psi (Kilopascals) | Foam Density |
|---|---|---|---|---|
| Thermal | 7 | 24.0 | 1150 (7923) | 2.48 |
| Furnace* | 7 | 19.0–19.5 | 1350 (9301) | 2.93 |

*Not an example of this invention
[1]Parts per hundred carbon black based on the weight of the polystyrene Surprisingly, the LOI exhibited by the present foam was much better than that of the comparative foam made with furnace black. The higher LOI suggests greater flame retardancy.

A significantly lower pressure drop was observed in making the present foam versus the comparative foam. The pressure drop was 200 psi (1378 kilopascals) lower for the foam made with thermal black.

While embodiments of the polymer structures, processes, and end uses of the present invention have been shown with regard to specific details, it will be appreciated that depending upon the manufacturing process and the manufacturer's desires, the present invention may be modified by various changes while still being fairly within the scope of the novel teachings and principles herein set forth.

What is claimed is:

1. A method for insulating a surface or enclosure, comprising applying to the surface or enclosure an insulative polymeric foam structure, comprising: a) a foamed polymeric material; and b) a quantity of carbon black incorporated in the polymeric material sufficient to reduce the thermal conductivity of the structure below that of a corresponding foam structure without the carbon black, the individual particles of carbon black being substantially free of agglomeration.

2. The method of claim 1, wherein the individual particles are substantially spherical.

3. The method of claim 1, wherein the carbon black is from about 1.0 to about 25 weight percent based upon the weight of the polymer material.

4. The method of claim 1, wherein the carbon black is from about 4 to about 10 weight percent based upon the weight of the polymer material.

5. The method of claim 1, wherein the individual particles have a particle size of greater than 150 nanometers.

6. The method of claim 1, wherein the individual particles have a particle size of about 200 to about 500 nanometers.

7. The method of claim 1, wherein the polymeric material comprises a thermoplastic polymer.

8. The method of claim 7, wherein the thermoplastic polymer comprises an alkenyl aromatic polymer.

9. The method of claim 8, wherein the alkenyl aromatic polymer comprises polystyrene.

10. The method of claim 9, wherein the foam structure is an extruded foam structure.

11. The method of claim 9, wherein the foam structure is a molded bead foam structure.

12. The method of claim 1, wherein the polymeric material comprises a thermoset polymer.

13. The method of claim 12, wherein the thermoset polymer comprises a polyisocyanurate.

14. The method of claim 12, wherein the thermoset polymer comprises a polyurethane.

15. The method of claim 12, wherein the thermoset polymer comprises a phenolic.

16. The method of claim 1, wherein the foam structure is closed-cell.

17. The method of claim 1, wherein the foam structure is fashioned into an insulating panel 0.95 centimeters to 15 centimeters thick.

18. The method of claim 1, wherein the surface or enclosure is insulated in a $-30°$ C. to $+50°$ C. temperature service range.

19. A method for insulating a surface or enclosure, comprising applying to the surface or enclosure an insulative polymeric foam structure, comprising: a) a foamed polymeric material; and b) a quantity of carbon black incorporated in the polymeric material sufficient to reduce the thermal conductivity of the structure below that of a corresponding foam structure without the carbon black, the carbon black being thermal black.

20. The method of claim 19, wherein the carbon black is from about 1.0 to about 25 weight percent based upon the weight of the polymer material.

21. The method of claim 19, wherein the carbon black is from about 4 to about 10 weight percent based upon the weight of the polymer material.

22. The method of claim 19, wherein the individual particles have a particle size of greater than 150 nanometers.

23. The method of claim 19, wherein the individual particles have a particle size of about 200 to about 500 nanometers.

24. The method of claim 19, wherein the polymeric material comprises a thermoplastic polymer.

25. The method of claim 24, wherein the thermoplastic polymer comprises an alkenyl aromatic polymer.

26. The method of claim 25, wherein the alkenyl aromatic polymer comprises polystyrene.

27. The method of claim 19, wherein the foam structure is an extruded foam structure.

28. The method of claim 19, wherein the foam structure is a molded bead foam structure.

29. The method of claim 19, wherein the polymeric material comprises a thermoset polymer.

30. The method of claim 29, wherein the thermoset polymer comprises a polyisocyanurate.

31. The method of claim 29, wherein the thermoset polymer comprises a polyurethane.

32. The method of claim 19, wherein the foam structure is closed-cell.

33. The method of claim 19, wherein the foam structure is fashioned into an insulating panel 0.95 centimeters to 15 centimeters thick.

34. The method of claim 19, wherein the surface or enclosure is insulated in a $-30°$ C. to $+50°$ C. temperature service range.

35. The method of claim 19, wherein the polymeric material is polystyrene, the foam structure being extruded, the foam structure being closed-cell, the foam structure being fashioned into an insulating panel 0.95 centimeters to 15 centimeters thick, the surface or enclosure being insulated in a $-30°$ C. to $+50°$ C. temperature service range.

36. A method for insulating a surface or enclosure, comprising applying to the surface or enclosure an insulative polymeric foam structure, comprising: a) a foamed polymeric material; and b) a quantity of carbon black incorporated in the polymeric material sufficient to reduce the thermal conductivity of the structure below that of a corresponding foam structure without the carbon black, the carbon black having a particle size of greater than 150 nanometers.

37. The method of claim 36, wherein the particle size is from about 200 to about 500 nanometers.

38. The method of claim 36, wherein the carbon black is thermal black.

39. The method of claim 36, wherein the carbon black is from about 1.0 to about 25 weight percent based upon the weight of the polymer material.

40. The method of claim 36, wherein the carbon black is from about 4 to about 10 weight percent based upon the weight of the polymer material.

41. The method of claim 37, wherein the polymeric material comprises a thermoplastic polymer.

42. The method of claim 41, wherein the thermoplastic polymer comprises an alkenyl aromatic polymer.

43. The method of claim 42, wherein the alkenyl aromatic polymer comprises polystyrene.

44. The method of claim 43, wherein the foam structure is an extruded foam structure.

45. The method of claim 43, wherein the foam structure is a molded bead foam structure.

46. The method of claim 36, wherein the polymeric material comprises a thermoset polymer.

47. The method of claim 46, wherein the thermoset polymer comprises a polyisocyanurate.

48. The method of claim 46, wherein the thermoset polymer comprises a polyurethane.

49. The method of claim 36, wherein the foam structure is closed-cell.

50. The method of claim 36, wherein the foam structure is fashioned into an insulating panel 0.95 centimeters to 15 centimeters thick.

51. The method of claim 36, wherein the surface or enclosure is insulated in a $-30°$ C. to $+50°$ C. temperature service range.

52. A process for making an insulative polymeric foam structure, comprising: a) heating a polymer material to form a melt material mixture; b) incorporating into the melt material mixture a quantity of carbon black sufficient to reduce the thermal conductivity below that of a corresponding foam structure without the carbon black, the carbon black being dispersed such that individual particles thereof are substantially free of agglomeration; c) incorporating into the melt material mixture a blowing agent at an elevated pressure to form a foamable gel; and d) extruding the foamable gel through a die to a zone of reduced pressure to form the foam structure.

53. The process of claim 52, wherein the individual particles are substantially spherical.

54. The process of claim 52, wherein the carbon black is from about 1.0 to about 25 weight percent based upon the weight of the polymer material.

55. The process of claim 52, wherein the carbon black is from about 4 to about 10 weight percent based upon the weight of the polymer material.

56. The process of claim 52, wherein the individual particles have a particle size of greater than 150 nanometers.

57. The process of claim 52, wherein the individual particles have a particle size of about 200 to about 500 nanometers.

58. The process of claim 52, wherein the polymeric material comprises a thermoplastic polymer.

59. The process of claim 58, wherein the thermoplastic polymer comprises an alkenyl aromatic polymer.

60. The process of claim 59, wherein the alkenyl aromatic polymer comprises polystyrene.

61. The process of claim 52, wherein the foam structure is closed-cell.

62. The process of claim 52, wherein the foam structure is extruded to form an insulating panel 0.95 centimeters to 15 centimeters thick.

63. The process of claim 52, wherein the carbon black is thermal black.

64. The process of claim 52, wherein the carbon black is thermal black, the foam structure being closed-cell, the foam structure being extruded to form an insulating panel 0.95 centimeters to 15 centimeters thick, the polymeric material being polystyrene.

65. A process for making an insulative polymeric foam structure, comprising: a) heating a polymer material to form a melt material mixture; b) incorporating into the melt material mixture a quantity of thermal black sufficient to reduce the thermal conductivity below that of a corresponding foam structure without the carbon black; c) incorporating into the melt material mixture a blowing agent at an elevated pressure to form a foamable gel; and d) extruding the foamable gel through a die to a zone of reduced pressure to form the foam structure.

66. The process of claim 65, wherein the blowing agent is incorporated at from about 4.0 to about 5.5 parts per hundred based upon the weight of the polymer material, the blowing agent comprising carbon dioxide.

67. An extruded, insulative polymeric foam structure, comprising: a) a polymeric material; and b) a quantity of carbon black incorporated in the polymeric material sufficient to reduce the thermal conductivity of the structure below that of a corresponding foam structure without the carbon black, the carbon black having a particle size of greater than 150 nanometers.

68. An extruded insulative polymer foam structure, comprising: a) a foamed polymeric material; and b) a quantity of carbon black incorporated in the polymeric material sufficient to reduce the thermal conductivity of the structure below that of a corresponding foam structure without the carbon black, the carbon black being thermal black.

69. The structure of claim 68, wherein the carbon black is from about 1.0 to about 25 weight percent based upon the weight of the polymer material.

70. The structure of claim 68, wherein the carbon black is from about 4 to about 10 weight percent based upon the weight of the polymer material.

71. The structure of claim 68, wherein the individual particles have a particle size of greater than 150 nanometers.

72. The structure of claim 68, wherein the individual particles have a particle size of about 200 to about 500 nanometers.

73. The structure of claim 68, wherein the polymeric material comprises a thermoplastic polymer.

74. The structure of claim 73, wherein the thermoplastic polymer comprises an alkenyl aromatic polymer.

75. The structure of claim 74, wherein the alkenyl aromatic polymer comprises polystyrene.

76. The structure of claim 68, wherein the foam structure has a thickness of from 0.95 centimeters to 15 centimeters.

77. The structure of claim 68, wherein the foam structure is closed-cell.

78. The structure of claim 68, wherein the foam structure has a thickness of from 0.95 centimeters to 15 centimeters, the polymeric material comprising polystyrene, the foam structure being closed-cell.

* * * * *